United States Patent [19]
Fuji

[11] Patent Number: 5,483,513
[45] Date of Patent: Jan. 9, 1996

[54] RECORDING STATE DETECTING APPARATUS AND OPTICAL RECORDING MEDIUM

[75] Inventor: Hiroshi Fuji, Soraku, Japan

[73] Assignee: Sharp Kabushiki Kaisha, Osaka, Japan

[21] Appl. No.: 293,756

[22] Filed: Aug. 22, 1994

[30] Foreign Application Priority Data

Aug. 25, 1993 [JP] Japan .................................. 5-210741

[51] Int. Cl.$^6$ ...................................................... G11B 7/00
[52] U.S. Cl. .................. 369/58; 369/54; 369/47; 369/124
[58] Field of Search .................. 369/58, 54, 53, 369/47, 48, 49, 32, 124, 59, 44.28, 44.34, 44.25, 44.11, 109

[56] References Cited

FOREIGN PATENT DOCUMENTS

| 58-80138 | 5/1983 | Japan . |
| 3-102601 | 4/1991 | Japan . |
| 3-237622 | 10/1991 | Japan . |
| 4-30331 | 2/1992 | Japan . |

OTHER PUBLICATIONS

Engl. abstract of MOUTAI/TEAC App. No. 58–80138–A, pub. May'83.
Engl. abstract of FUJI+/SHARP App. No. 3–102601–A, pub. Apr.'91.
Engl. abstract of ISHIDA/MATSU. App. No. 4–30331–A, publ. Feb.'92.
T. Maeda, et al., "Characteristics of Read/Write on Magneto–Optical Disk," Technical Report of Inst. of Electronics Information & Communications Engineers MR 92–62 Japan (1992).
H. Fuji, et al., "Write Power Control Method for Multi–Pulse Recording", Technical Report of Inst. of Electronics, Information & Communications Engineers C–505, Japan (1994).

*Primary Examiner*—Georgia Y. Epps
*Assistant Examiner*—Muhammad N. Edun
*Attorney, Agent, or Firm*—David G. Conlin; Milton Oliver

[57] ABSTRACT

A recording state detecting apparatus is provided with a saturated amplitude detecting unit for detecting a saturated amplitude level of a reproduced signal from a long mark obtained from a magneto-optical disk, an unsaturated amplitude detecting unit for detecting an unsaturated amplitude level of a reproduced signal from an isolation pattern of a short mark and a calculating unit for detecting a recording state (recording sensitivity or amplitude ratio) from the saturated amplitude level and the unsaturated amplitude level. As a result, an accurate recording state, namely, the recording sensitivity or the amplitude ratio of a recording mark can be detected, thereby making it possible to carry out a setting of an optimum recording condition by test-writing, a check on a recording error by verifying, etc. As a result, high-density recording can be realized.

17 Claims, 5 Drawing Sheets

FIG. 9 PRIOR ART

RECORDING STATE DETECTING APPARATUS AND OPTICAL RECORDING MEDIUM

FIELD OF THE INVENTION

The present invention relates to a recording state detecting apparatus for detecting a recording state in order to carry out setting of an optimum recording condition by test-writing, a check on a recording error by verifying, etc. and an optical recording medium suitable for detecting the recording state.

BACKGROUND OF THE INVENTION

The following will discuss the conventional test-writing method and verifying method.

Figure 8:
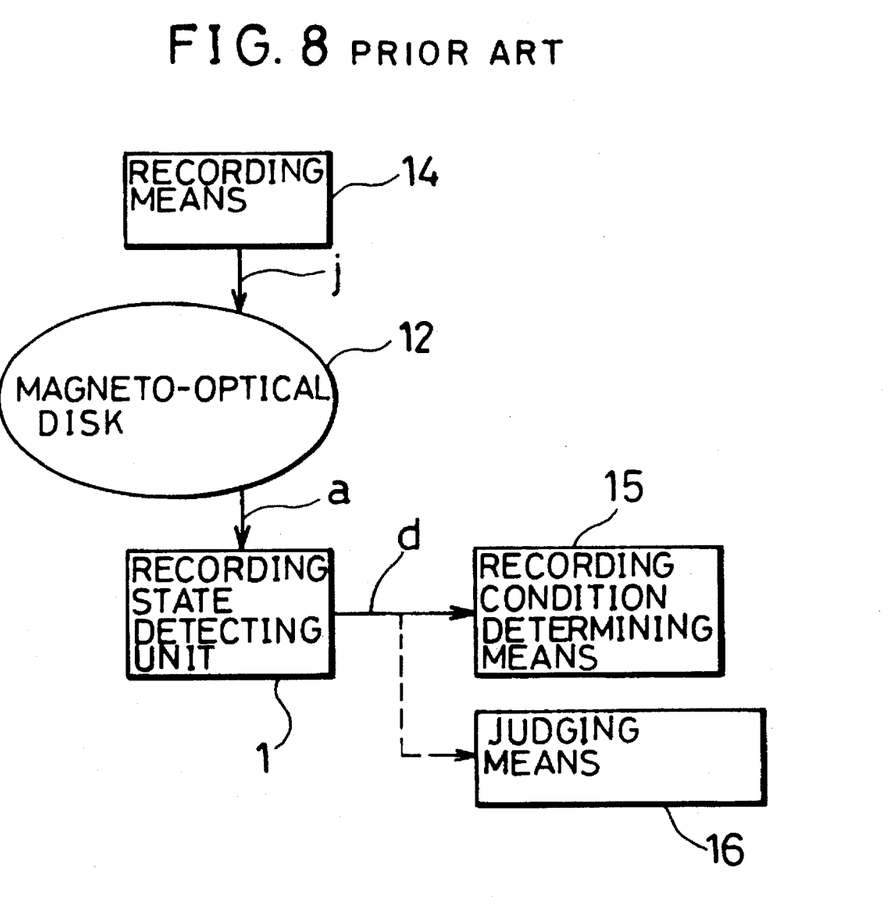
FIG. 8 is a constitutional drawing which schematically shows the recording state detecting apparatus in a conventional magneto-optical apparatus.

First, in a test-writing method disclosed in Japanese Laid-Open Patent Application No. 80138/1983 (Tokukaisho 58-80138), as shown in FIG. 8, intensity of a recording light j is changed so that a test signal is recorded to a magneto-optical disk 12 by recording means 14 and the test signal is regenerated from the magneto-optical disk 12 by regenerating means (not shown). A recording state detecting apparatus 1 checks a recording state of the test signal based upon a reproduced signal a from the regenerating means and outputs a recording state detecting signal d which shows the recording state to recording condition determining means 15. The recording condition determining means 15 determines the intensity of the recording light j which can provide the best reproduced signal a, namely, the optimum intensity of the recording light j based upon a recording state detecting signal d. This makes it possible to record subsequent signals using the recording light j having the optimum intensity.

Furthermore, in a verifying method disclosed in Japanese Laid-Open Patent Application No. 30331/1992 (Tokukaihei 4-30331), the test signal is not preliminarily recorded, but a desired signal is recorded to the magneto-optical disk 12 from the beginning, and just after that, the signal is regenerated. The recording state detecting apparatus 1 checks the recording state of the signal based upon the reproduced signal a from the regenerating means and outputs the recording state detecting signal d which shows the recording state to judging means 16. The judging means 16 judges whether or not the signal is correctly recorded. This makes it possible to always check a recording error.

Figure 9:
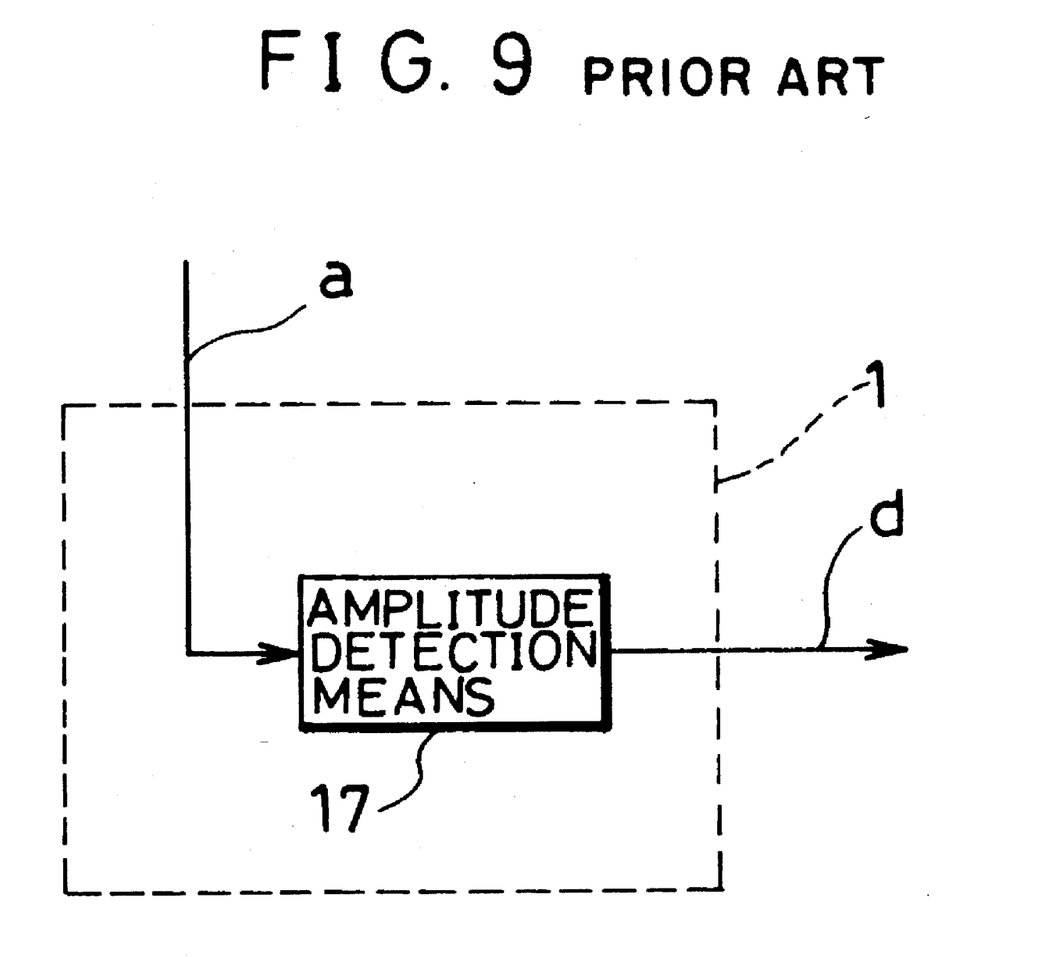
FIG. 9 is a constitutional drawing which schematically shows one example of the recording state detecting apparatus in FIG. 8.

As shown in FIG. 9, the recording state detecting apparatus 1 which is used for the test-writing method and the verifying method is constituted of amplitude detection means 17 for detecting an amplitude level of the reproduced signal a. Concretely, an envelope detection circuit, for example, can be used for the amplitude detection means 17.

Moreover, in the verifying method reported on Page 13 of IEICE technical report MR 92-62 (Nov. 1992), a repeat pattern of a short mark and a repeat pattern of a long mark are recorded and the recording condition is set so that a difference in amplitude of each reproduction waveform becomes 0.

However, in the conventional arrangement, since the amplitude level of the reproduced signal a changes in accordance with a change in reflectance and a Kerr rotation angle of the magneto-optical disk 12, there exists a problem that accurate test-writing and verifying are hard to carry out. For this reason, it is inconvenient especially for carrying out high-density recording.

In addition, in the verifying method reported on the IEICE technical report, since the reproduction waveform level of the repeat pattern of the short mark is changed by not only the recording sensitivity but also optical transfer characteristic, there exists a problem that the recording sensitivity itself cannot be detected. In other words, since an adjoining recording mark enters a light spot; a level detection error occurs.

SUMMARY OF THE INVENTION

It is a first object of the present invention to provide a recording state detecting apparatus, which is capable of grasping and detecting an accurate recording state, namely, recording sensitivity or amplitude ratio of a recording mark in the case where test-writing and verifying are carried out, in order to realize high-density recording. In order to achieve the above object, the recording state detecting apparatus of the present invention is characterized by including:

saturated amplitude detection means for detecting a saturated amplitude level of a reproduced signal obtained from an optical recording medium;

unsaturated amplitude detection means for detecting an unsaturated amplitude level of the reproduced signal; and calculation means for detecting the recording state from the saturated amplitude level detected by the saturated amplitude detection means and the unsaturated amplitude level detected by the unsaturated amplitude detection means.

With the above arrangement, since the recording state is obtained from the saturated amplitude level and the unsaturated amplitude level of the reproduced signal, the accurate recording state, namely, the recording sensitivity or the amplitude ratio of the recording mark can be detected.

This makes it possible to carry out setting of an optimum recording condition by test-writing, a check on a recording error by verifying. As a result, high-density recording can be realized.

In addition, it is a second object of the present invention to provide an optical recording medium which is capable of detecting the accurate recording state by using the recording state detecting apparatus without destroying recording data.

In order to achieve the above object, the optical recording medium of the present invention is characterized by that a first area where a mark corresponding to data is recorded and a second area where a mark for detecting the recording state is recorded are independently provided.

With the above arrangement, since the area where the mark corresponding to data is recorded and the area where the mark for detecting the recording state is recorded are independently provided, the mark for detecting the recording state can be recorded without destroying data.

This makes it possible to detect the accurate recording state by using the recording state detecting apparatus without destroying data.

For a fuller understanding of the nature and advantages of the invention, reference should be made to the ensuing detailed description taken in conjunction with the accompanying drawings.

BRIEF DESCRIPTION OF THE DRAWINGS

FIGS. 2 (a) and (b) are explanatory drawings which show detection of a recording state by the recording state detecting apparatus in FIG. 1.

FIGS. 5 (a) through (c) are explanatory drawings which show detection of the recording state by the recording state detecting apparatus in FIG. 4.

FIGS. 6 (a) and (b) are explanatory drawings which show the detection of the recording state by the recording state detecting apparatus in FIG. 1 from a magneto-optical disk where a long recording mark is recorded.

DESCRIPTION OF THE EMBODIMENT

Referring to FIGS. 1 through 7, the following description will discuss one embodiment of the present invention.

Figure 1:
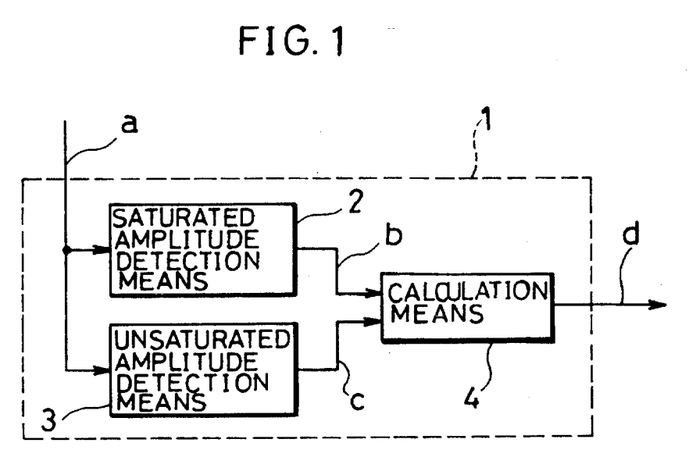
FIG. 1 is a constitutional drawing which schematically shows a recording state detecting apparatus of the present invention.

As shown in FIG. 1, a recording state detecting apparatus 1 of the present embodiment is constituted of saturated amplitude detection means 2, unsaturated amplitude detection means 3 and calculation means 4. A reproduced signal a obtained from a magneto-optical disk (optical recording medium) is inputted to the saturated amplitude detection means 2 and the unsaturated amplitude detection means 3. The saturated amplitude detection means 2 detects a saturated amplitude level A1 from the reproduced signal a and outputs a saturated amplitude detecting signal b. The unsaturated amplitude detection means 3 detects an unsaturated amplitude level A2 from the reproduced signal a and outputs an unsaturated amplitude detecting signal c. The calculation means 4 calculates a recording state from the saturated amplitude detecting signal b and the unsaturated amplitude detecting signal c and outputs a recording state detecting signal d.

Figure 2:
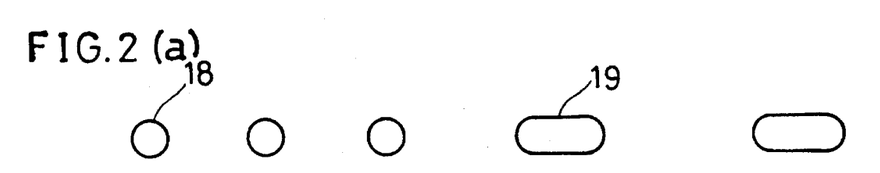

As shown in FIG. 2, the saturated amplitude level A1 (first amplitude value) is a level of the reproduced signal a obtained from a long recording mark 19, and the unsaturated amplitude level A2 (second amplitude value) is a level of the reproduced signal a obtained from a short recording mark 18. Furthermore, an upper limit value (lower limit value) of the reproduced signal a obtained from the long recording mark 19 accords with an upper limit value (lower limit value) of the reproduced signal a obtained from the short recording mark 18. Here, the recording marks 18 and 19 are areas where magnetizing direction is upward (or downward).

The saturated amplitude level A1 and the unsaturated amplitude level A2 satisfy the following equations:

$$A1 = C \times R \times \theta_K,$$

$$A2 = C \times R \times \theta_K \times S.$$

Here, S represents recording sensitivity, R represents reflectance of the magneto-optical disk, $\theta_K$ represents Kerr rotation angle and C represents a proportional constant. Therefore, the recording sensitivity S can be obtained according to the following formula:

$$S = A2/A1.$$

The recording sensitivity S is equal to a ratio of the unsaturated amplitude level A2 to the saturated amplitude level A1, namely, an amplitude ratio D. The recording sensitivity S or the amplitude ratio D exactly reflects the recording state. Furthermore, it does not depend on the reflectance and the Kerr rotation angle.

Figure 3:
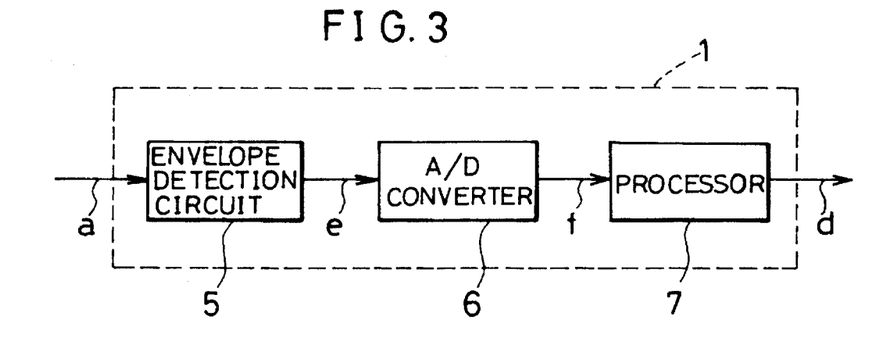
FIG. 3 is a block diagram which shows one concrete example of the recording state detecting apparatus in FIG. 1.

FIG. 3 shows a concrete example of the recording state detecting apparatus 1.

The recording state detecting apparatus 1 is constituted of an envelope detection circuit 5 for taking out envelope of a reproduced signal a so as to output an envelope detecting signal e, an A/D (analog/digital) converter 6 for converting the envelope detecting signal e to a digital signal f and a processor 7 for calculating the recording sensitivity from the digital signal f so as to output a recording state detecting signal d.

The saturated amplitude detection means 2 is composed of the envelope detection circuit 5 and the A/D converter 6. The unsaturated amplitude detection means 3 is composed of the envelope detection circuit 5 and the A/D converter 6. The calculation means 4 is the processor 7.

In the case where a saturated amplitude level A1 and an unsaturated amplitude level A2 are detected by the envelope detection circuit 5 having a time constant circuit, allowing for a charging time of the time constant circuit, it is preferable that a short recording mark 18 is first recorded, immediately after that, a long recording mark 19 is recorded (refer to FIG. 2).

Here, two envelope detecting circuits 5,5 may be installed in order to individually detect the saturated amplitude level A1 and the unsaturated amplitude level A2. In this case, it does not make difference whether the recording mark 18 or the recording mark 19 is first recorded.

In addition, instead of the processor 7, an AGC (auto gain control) circuit can be used. In this case, it is necessary that a great quantity of the recording marks 18 and 19 are recorded so that the reproduced signal a can be obtained from the recording marks 18 and 19 for a longer time than the time constant of the AGC circuit.

Figure 4:
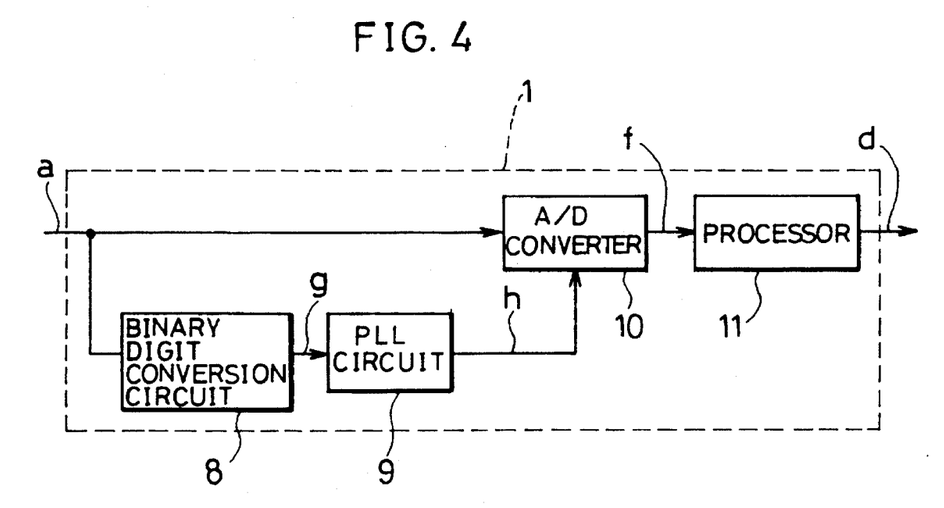
FIG. 4 is a block diagram which shows another concrete example of the recording state detecting apparatus in FIG. 1.

FIG. 4 shows another concrete example of the recording state detecting apparatus 1.

The recording state detecting apparatus 1 is composed of a binarizing circuit 8 for binarizing the reproduced signal a so as to output a binarized signal g, a PLL (Phase Locked Loop) circuit 9 for outputting a clock pulse h which synchronizes with the binarized signal, an A/D converter 10 for performing sampling of the reproduced signal a in accordance with a timing of the clock pulse h so as to convert the sampled reproduced signal into the digital signal f and a processor 11 for calculating the recording sensitivity S from the digital signal f so as to output a recording state detecting signal d.

The saturated amplitude detection means 2 is composed of the binarizing circuit 8, the PLL circuit 9 and the A/D converter 10. The unsaturated amplitude detection means 3 is composed of the binarizing circuit 8, the PLL circuit 9 and the A/D converter 10. The calculation means 4 is the processor 11.

Figures 5A, 5B, 5C:
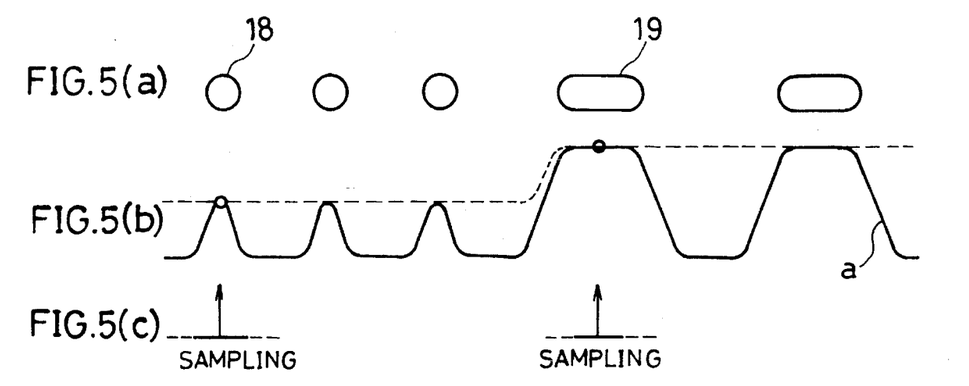

As shown in FIG. 5, in the recording state detecting apparatus 1, since sampling is performed at a peak of the reproduced signal a, it does not make difference whether the recording marks 18 or 19 is first recorded.

Figures 6A, 6B:
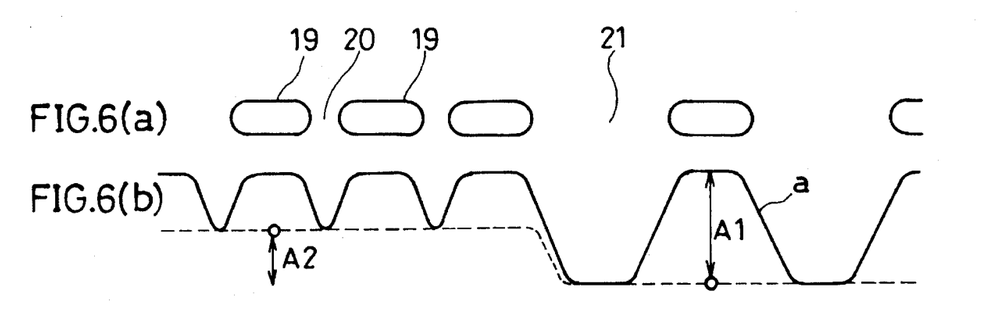

In the above embodiment, the recording sensitivity S is obtained from the magneto-optical disk where the long recording mark 19 and the short recording mark 18 are recorded, but as shown in FIG. 6, the recording sensitivity S can be obtained from the magneto-optical disk where only the long recording mark 19 is recorded. In other words, the saturated amplitude level A1 can be obtained from the reproduced signal a obtained from a long non-mark 21 between the long recording marks 19 and 19, and the unsaturated amplitude level A2 can be obtained from the reproduced signal a obtained from a short non-mark 20 between the long recording marks 19 and 19. Here, the non-marks 20 and 21 are area where the magnetizing direction is opposite to that of the recording marks 18 and 19.

Moreover, the recording state can be also detected from a combination pattern of the recording marks and the non-marks.

For example, as shown in FIG. 5, a first mark pattern is composed of a recording mark whose length in a scanning direction of a light beam is longer than a beam diameter, namely, the long recording mark 19 and a non-mark section which adjoins the long recording mark 19 and the length in the scanning direction is longer than the beam diameter. A second mark pattern is composed of a recording mark whose length in the scanning direction of the light beam is shorter than the beam diameter, namely, the short recording mark 18 and a non-mark section which adjoins the short recording mark 18 and the length in the scanning direction is longer than the beam diameter.

Otherwise, as shown in FIG. 6, a first mark pattern is composed of the recording mark whose length in scanning direction of the light beam is longer than the beam diameter, namely, the long recording mark 19, and a non-mark section 21 which adjoins the long recording mark 19 and the length in the scanning direction is longer than the beam diameter. A second mark pattern is made up the recording mark where the scanning direction length of the light beam is longer than the beam diameter, namely, the long recording mark 19 and a non-mark section 20 which adjoins the long recording mark 19 and is shorter than the beam diameter.

In addition, in both the cases, as shown in FIG. 6, the same mark patterns do not have to be repeated. The reason is that a signal of the saturated amplitude level or the unsaturated amplitude level can be detected as long as the non-mark section is provided at least on one side of the recording mark.

Figure 7:
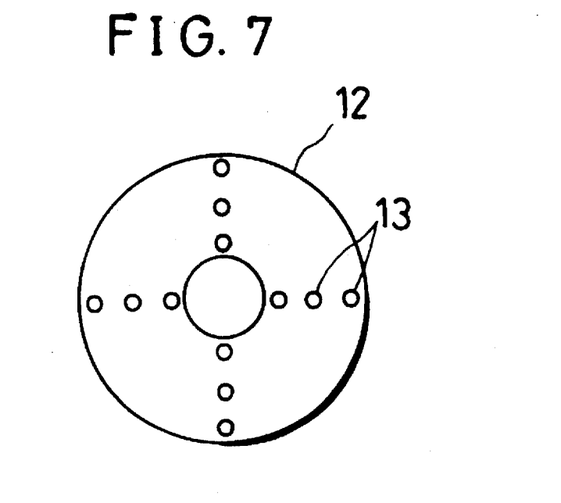
FIG. 7 is an explanatory drawing of a magneto-optical disk having areas for an exclusive use of recording a recording mark for detecting a saturated amplitude level and an unsaturated amplitude level.

In a magneto-optical disk 12 shown in FIG. 7, in addition to the data recording area, exclusive recording areas 13 . . . for recording the recording marks 18 and 19 are provided. This makes it possible to record the recording marks 18 and 19 for detecting the saturated amplitude level A1 and the unsaturated amplitude level A2 without destroying recording data. Here, the drawing shows the magneto-optical disk 12 where 12 recording areas 13 . . . are provided, but a number, a size and an arrangement of the recording areas 13 . . . can be determined as necessary.

In addition, a judgement is made as to whether or not the level of the short recording mark is suitable using the long recording mark 19 as a reference level at the time of verifying. For example, if the second mark pattern is recorded as a mark pattern for verifying together with recording data, a detection can be made as to whether or not they are optimumly recorded immediately after the recording. Moreover, A similar pattern in the recording data may be detected without recording the pattern for verifying. In any cases, it is preferable that the first mark pattern is provided to an area separated from the area for recording data.

Here, the recording state is detected before the data is recorded (however, the recording state should not be always detected immediately before the recording). The reason is that the recording state should be detected in the case where a change in an ambient temperature, a variation in sensitivity per disk (replacement of disk) and a difference in a kind of disks (for example, a difference in a maker of disks) occur.

In addition, the above embodiment explains the present invention illustrating the recording state detecting apparatus 1 in a magneto-optical disk apparatus, it is not necessary that the present invention is limited to this, so it is also applicable to the recording state detecting apparatus 1 in a magneto-optical card apparatus and a magneto-optical tape apparatus. Furthermore, the present invention can be widely applied not only to the recording state detecting apparatus 1 in the magneto-optical-type apparatus but also to the recording state detecting apparatus 1 in an information recording reproducing apparatus which uses a write once read many-type or phase-change-type optical recording medium.

Here, in an optical recording medium other than a magneto-optical-type one, since the unsaturated amplitude level A2 is not necessarily in proportion to the recording sensitivity S, in this case, a calculation equation in the calculation means 4 is appropriately changed.

The recording state detecting apparatus 1 is arranged so as to have:

the saturated amplitude detection means 2 for detecting the saturated amplitude level A1 of the reproduced signal a from the long mark 19 obtained from the magneto-optical disk 12;

the unsaturated amplitude detection means 3 for detecting the unsaturated amplitude level A2 of the reproduced signal a from the isolation pattern of the short mark 18; and the calculation means 4 for obtaining the recording state (the recording sensitivity S or the amplitude ratio D) from the saturated amplitude level A1 and the unsaturated amplitude level A2 of the reproduced signal a.

Therefore, since the recording state is obtained from the saturated amplitude level A1 and the unsaturated amplitude level A2 of the reproduced signal a, the accurate recording state, namely, the recording sensitivity S or the amplitude ratio D can be detected. This makes it possible to accurately carry out a setting of an optimum recording condition by test-writing, a check on a recording error by verify, etc. As a result, high-density recording can be realized. Furthermore, since the reproduction waveform level of the isolation pattern of the short mark 18 is changed only by the recording sensitivity but is not changed by the optical transfer characteristic, the recording sensitivity S itself is detectable. In other words, since the adjoining recording marks do not enter a light spot, a level detection error does not occur.

The magneto-optical disk 12 is arranged so as to be respectively provided with the area where the recording marks 18 and 19 which corresponds to data are recorded, and the recording areas 13 . . . where the recording marks 18 and 19 for detecting the saturated amplitude level A1 and the unsaturated amplitude level A2 are recorded.

This makes it possible to record the recording marks 18 and 19 for detecting the saturated amplitude level A1 and the unsaturated amplitude level A2 without destroying data. Therefore, the recording state detecting apparatus 1 can ensure the precise recording state without destroying data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recording state detection method for detecting a recording state of an optical recording medium, comprising the steps of:

recording a first mark pattern for obtaining a saturated amplitude level reproduced signal and a second mark pattern for obtaining an unsaturated amplitude level reproduced signal whose upper limit value becomes equal to an upper limit value of the saturated amplitude level reproduced signal or whose lower limit value becomes equal to a lower limit value of the saturated amplitude level reproduced signal to the optical recording medium;

detecting a first amplitude value of the reproduced signal obtained from the first mark pattern by emitting a light beam to the first mark pattern and a second amplitude value of the reproduced signal obtained from the second mark pattern by emitting the light beam to the second mark pattern; and detecting the recording state by comparing the detected first amplitude value and second amplitude value.

2. The recording state detection method as defined in claim 1, wherein said step of detecting the recording state is a step of detecting the recording sensitivity obtained by dividing the second amplitude value by the first amplitude value.

3. The recording state detection method as defined in claim 2, wherein:

said first mark pattern is composed of a recording mark whose length in a scanning direction of a light beam is longer than a light beam diameter and a non-mark section which adjoins the recording mark and the length in the scanning direction is longer than the light beam diameter, said second mark pattern is composed of a recording mark whose length in the scanning direction of the light beam is shorter than the light beam diameter and a non-mark section which adjoins the recording mark and the length in the scanning direction is longer than the light beam diameter.

4. The recording state detection method as defined in claim 3, wherein said optical recording medium includes:

a first area where the first mark pattern and the second mark pattern are recorded; and a second area where marks corresponding to data are recorded.

5. The recording state detection method as defined in claim 2, wherein:

said first mark pattern is composed of a recording mark whose length in a scanning direction of a light beam is longer than a light beam diameter and a non-mark section which adjoins the recording mark and the length in the scanning direction is longer than the light beam diameter, said second mark pattern is composed of a recording mark whose length in the scanning direction of the light beam is longer than the light beam diameter and a non-mark section which adjoins the recording mark and the length in the scanning direction is shorter than the light beam diameter.

6. The recording state detection method as defined in claim 2, wherein said optical recording medium includes:

a first area where the first mark pattern and the second mark pattern are recorded; and a second area where marks corresponding to data are recorded.

7. The recording state detection method as defined in claim 1, wherein:

said first mark pattern is composed of a recording mark whose length in a scanning direction of a light beam is longer than a light beam diameter and a non-mark section which adjoins the recording mark and the length in the scanning direction is longer than the light beam diameter, said second mark pattern is composed of a recording mark whose length in the scanning direction of the light beam is shorter than the light beam diameter and a non-mark section which adjoins the recording mark and the length in the scanning direction is longer than the light beam diameter.

8. The recording state detection method as defined in claim 7, wherein said optical recording medium includes:

a first area where the first mark pattern and the second mark pattern are recorded; and a second area where marks corresponding to data are recorded.

9. The recording state detection method as defined in claim 1, wherein:

said first mark pattern is composed of a recording mark whose length in a scanning direction of a light beam is longer than a light beam diameter and a non-mark section which adjoins the recording mark and the length in the scanning diameter is longer than the light beam diameter, said second mark pattern is composed of a recording mark whose length in the scanning direction of the light beam is longer than the light beam diameter and a non-mark section which adjoins the recording mark and the length in the scanning direction is shorter than the light beam diameter.

10. The recording state detection method as defined in claim 1, wherein said optical recording medium includes:

a first area where the first mark pattern and the second mark pattern are recorded; and a second area where marks corresponding to data are recorded.

11. A recording state detecting apparatus for detecting a recording state of an optical recording medium, comprising:

saturated amplitude detection means for detecting a first amplitude value of a reproduced signal from a first mark pattern;

unsaturated amplitude detection means for detecting a second amplitude value of a reproduced signal from a second mark pattern; and calculation means for detecting the recording state from the first amplitude value and the second amplitude value which have been detected.

12. The recording state detecting apparatus as defined in claim 11, wherein:

said saturated amplitude detection means is composed of an envelope detection circuit for taking out envelope of the reproduced signal so as to output an envelope detecting signals and an A/D converter for converting the envelope detecting signal into a digital signal, said unsaturated amplitude detection means is composed of an envelope detection circuit for taking out envelope of the reproduced signal so as to output an envelope detecting signal and an A/D converter for converting the envelope detecting signal into a digital signal.

13. The recording state detecting apparatus as defined in claim 11, wherein said calculation means is a processor for calculating recording sensitivity from the digital signal outputted from said saturated amplitude detection means and the digital signal outputted from said unsaturated amplitude detection means so as to output a recording state detecting signal.

14. The recording state detecting apparatus as defined in claim 11, wherein said calculation means is an AGC circuit for calculating the recording sensitivity from the digital signal outputted from said saturated amplitude detection means and the digital signal outputted from said unsaturated amplitude detection means so as to output a recording state detecting signal.

15. The recording state detecting apparatus as defined in claim 11, wherein:

said saturated amplitude detection means is composed of a binarizing circuit for binarizing the reproduced signal so as to output the binarized signal, a PLL circuit for outputting a clock pulse in synchronization with the binarized signal and an A/D converter for making sampling of the reproduced signal in accordance with a timing of the clock pulse so as to convert the sampled reproduced signal into a digital signal, said unsaturated amplitude detection means is composed of a binarizing circuit for binarizing the reproduced signal so as to output the binarized signal, a PLL circuit for outputting a clock pulse in synchronization with the binarized signal and an A/D converter for making sampling of the reproduced signal in accordance with a timing of the clock pulse so as to convert the reproduced signal into a digital signal, and said calculation means is a processor for calculating the recording sensitivity from the digital signal outputted from said saturated amplitude detection means and the digital signal outputted from said unsaturated amplitude detection means so as to output a recording state detecting signal.

16. The recording state detecting apparatus as defined in claim 11, wherein said saturated amplitude detection means and said unsaturated amplitude detection means is composed of common means.

17. The recording state detecting apparatus as defined in claim 11, wherein said first mark pattern and second mark pattern are recorded enough to obtain the reproduced signal for a longer time than a time constant of said AGC circuit.

* * * * *